United States Patent [19]

Suzuki

[11] Patent Number: 5,216,314
[45] Date of Patent: Jun. 1, 1993

[54] PRESSURE FORCE ADJUSTING MECHANISM FOR A VIBRATION WAVE DRIVEN MOTOR

[75] Inventor: Ryuji Suzuki, Yokohama, Japan
[73] Assignee: Canon Kabushiki Kaisha, Tokyo, Japan
[21] Appl. No.: 921,373
[22] Filed: Jul. 29, 1992

Related U.S. Application Data

[63] Continuation of Ser. No. 610,949, Nov. 9, 1990, abandoned.

[30] Foreign Application Priority Data

Nov. 16, 1989 [JP] Japan .................................. 1-298114

[51] Int. Cl.⁵ ............................................ H01L 41/08
[52] U.S. Cl. ..................................... 310/323; 74/625; 354/453; 362/226
[58] Field of Search ............... 74/89, 57, 625; 310/81, 310/323; 354/457, 453, 195.1; 362/226

[56] References Cited

U.S. PATENT DOCUMENTS

| | | | |
|---|---|---|---|
| 1,347,737 | 7/1920 | Douglas | 362/226 |
| 3,717,758 | 2/1973 | Willis | 362/226 |
| 4,491,401 | 1/1985 | Inaba et al. | 354/453 X |
| 4,560,263 | 12/1985 | Katsuma et al. | 310/323 X |
| 4,649,311 | 3/1987 | Mukohjima et al. | 310/323 |
| 4,743,791 | 5/1988 | Kawai | 310/323 |
| 4,771,203 | 9/1988 | Mukohjima et al. | 310/323 |
| 4,793,689 | 12/1988 | Aoyagi et al. | 310/323 X |
| 4,918,351 | 4/1990 | Kawai | 310/323 |
| 4,937,488 | 6/1990 | Fujie et al. | 310/323 |

Primary Examiner—Richard M. Lorence
Assistant Examiner—Benjamin Levi
Attorney, Agent, or Firm—Fitzpatrick, Cella, Harper & Scinto

[57] ABSTRACT

A pressure force adjusting mechanism for a vibration wave driven motor for applying a predetermined pressure force for frictionally driving an annular elastic member in which a travelling vibration wave is formed relative to a movable member is provided with a fixed support member for supporting the elastic member so as to have a degree of freedom in the axial direction thereof, a pressing member for pressing the elastic member from the axial rear thereof toward the movable member, and a holding member receiving the reaction force of the pressing member and fixedly fitted to the fixed support member. The holding member and the fixed support member are fixed by a projected portion which is formed on the holding member being engaged with the bayonet type engagement portion of the fixed support member. The engagement portion has its pressure force holding engagement surface against which the projected portion bears formed into an inclined surface inclined with respect to the axial direction.

8 Claims, 6 Drawing Sheets

PRESSURE FORCE ADJUSTING MECHANISM FOR A VIBRATION WAVE DRIVEN MOTOR

This application is a continuation of application Ser. No. 07/610,949 filed Nov. 9, 1990 now abandoned.

BACKGROUND OF THE INVENTION

1. Field of the Invention

This invention relates to a pressure force adjusting mechanism in an annular vibration wave driven motor for causing an elastic member in which a travelling vibration wave is formed and a movable member to be pressed with a predetermined pressure force.

2. Related Background Art

A vibration wave driven motor is generally such that a movable member is urged against a metallic elastic member formed, for example, into an annular shape and in which a travelling vibration wave is formed and the movable member is frictionally driven by a travelling vibration wave excited in the elastic member and the pressure force of the elastic member and the movable member affects the performance of the motor. Therefore, provision is made of a pressure force adjusting mechanism for applying a set pressure force.

Heretofore, a pressure force adjusting mechanism for a vibration wave driven motor has usually used n adjusting washer between a pressing member (a conical disk-spring) and a fixed member to make the amount of flexure of the pressing member constant to thereby adjust it to a set pressure force value. Also, another pressure force adjusting mechanism has made the amount of flexure of the pressing member constant by the manner in which a nut or the like is fastened, to thereby adjust it to a set pressure force value.

However, in the case of prior-art pressure force adjusting mechanisms which use an adjusting washer, it is very cumbersome to incorporate the adjusting washer, and adjustment is such that the amount of flexure of the pressing member is made constant, whereby it is adjusted to the set pressure force value. However, because of the pressure irregularity in the spring characteristic value of individual pressing members, it is difficult to adjust the amount of flexure to a set pressure force value only by setting the amount of flexure. To solve this problem, the spring characteristics of individual pressing members may be measured in advance, the amount of flexure may be determined in view of the characteristic values thereof, and the force may be adjusted by the use of an adjusting washer. However, in this case mass production is difficult and it very cumbersome to adjust or to measure the spring characteristics of individual pressing members. This has led to the disadvantage that considerable time is spent for the adjustment.

The latter system in which a nut or the like is fastened is a method of making the amount of flexure of the pressing member constant by the manner in which the nut or the like is fastened. However, in this case, the amount of flexure is used for pressing, and the aforementioned problem arises. To solve this problem, it would also occur to convert the pressure force of the pressing member into nut fastening torque and adjust it to a set pressure force value. However, but in such method, it is necessary to effect adjustment with friction torque which is produced when the nut is rotated. This has led to the disadvantage that an error due to the irregularity of the friction torque is added and it becomes considerably difficult to adjust the pressure force to a set pressure force value.

SUMMARY OF THE INVENTION

It is an object of the present invention to solve the above-noted problems peculiar to the prior art and to provide a pressure force adjusting mechanism for a vibration wave driven motor which can set the pressure force to a set value without irregularity.

It is another object of the present invention to provide a pressure force adjusting mechanism for a vibration wave driven motor which is easy to adjust.

It is still another object of the present invention to provide a pressure force adjusting mechanism for a vibration wave driven motor which is suitable for the mass production of vibration wave driven motors.

Other objects of the present invention will become apparent from the following detailed description of the invention.

DESCRIPTION OF THE PREFERRED EMBODIMENTS

Figure 1:
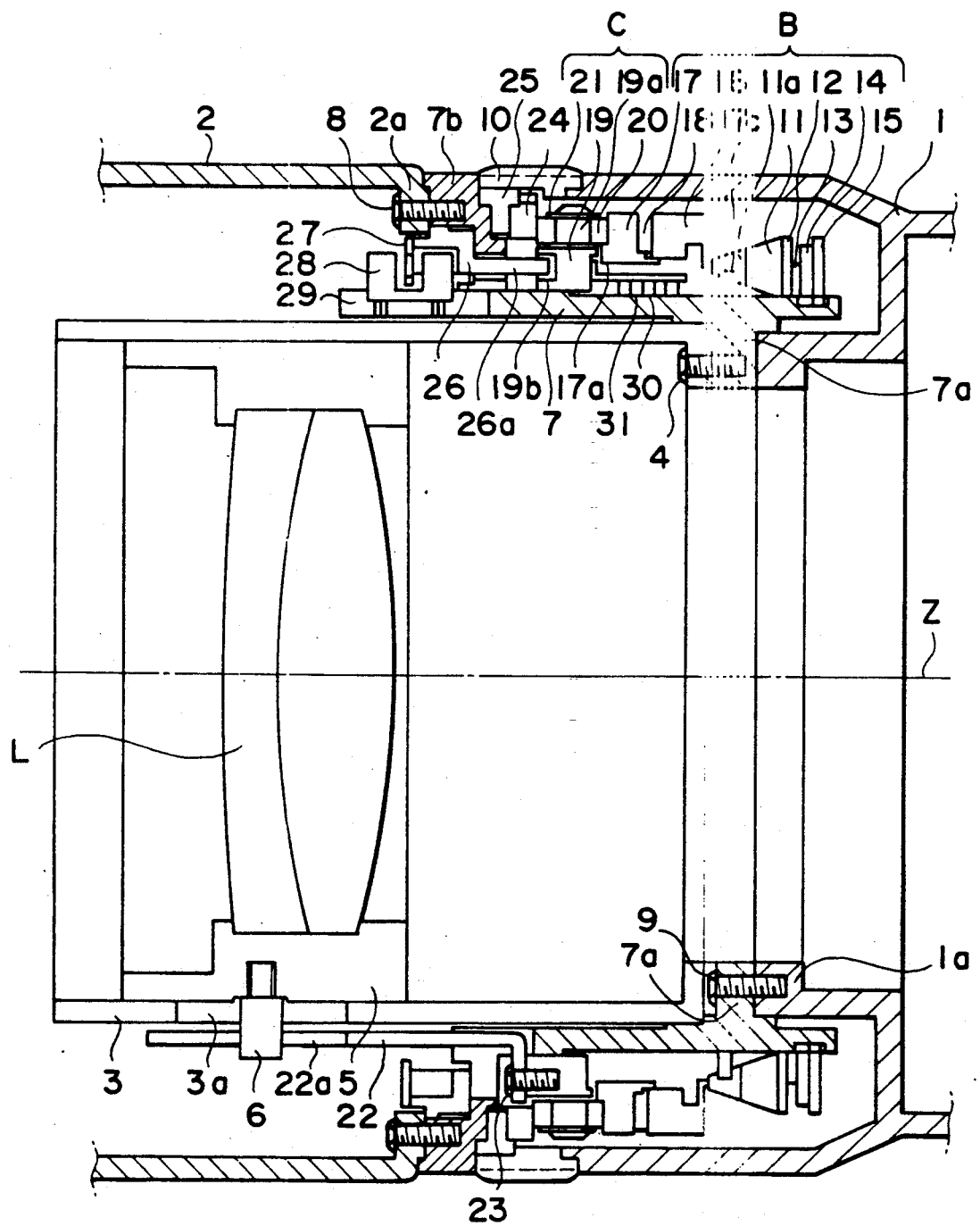
FIG. 1 is a longitudinal cross-sectional view of a lens barrel carrying thereon an embodiment of the pressure force adjusting mechanism of the present invention.
Figure 2:
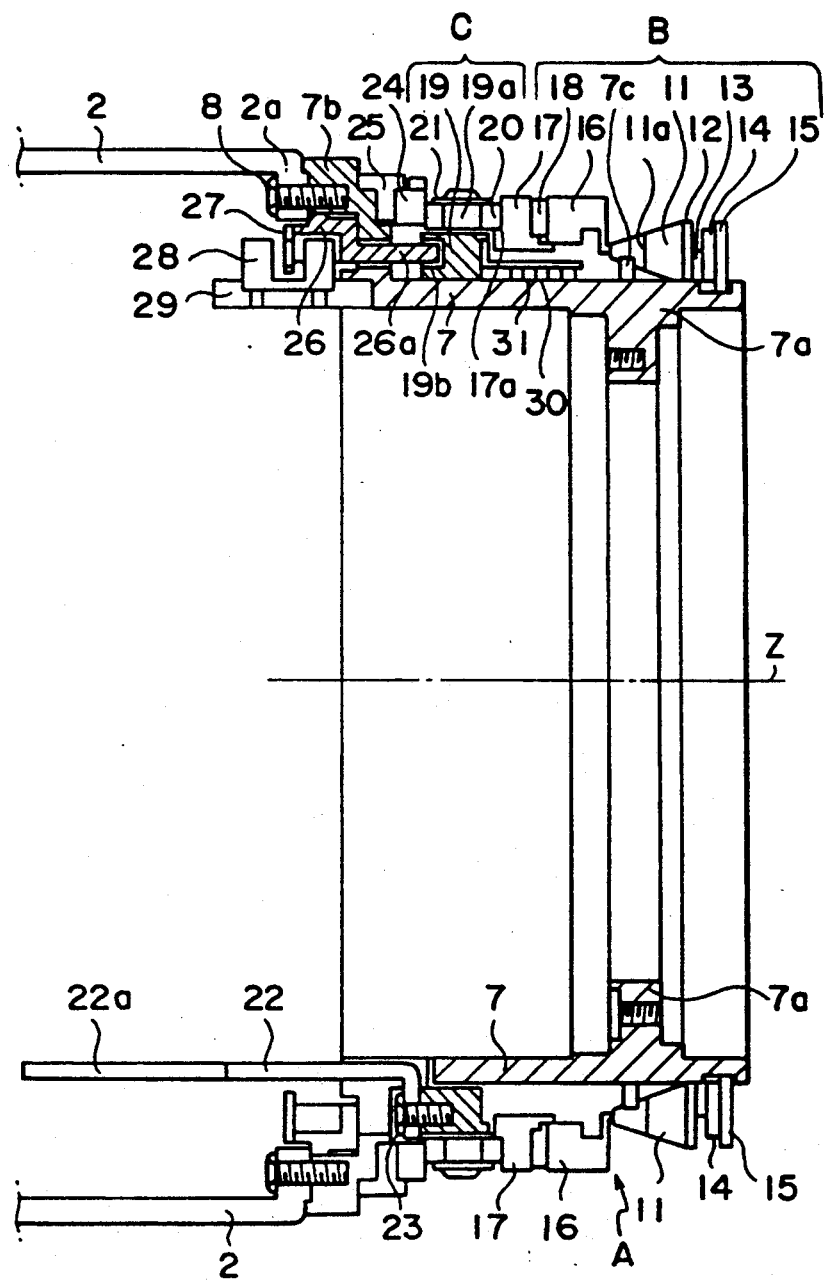
FIG. 2 is a longitudinal cross-sectional view of a drive force generating unit A carrying the pressure force adjusting mechanism thereon.

FIG. 1 is a longitudinal cross-sectional view showing the essential portions of an embodiment of a lens barrel which can effectively carry out the present invention, and FIG. 2 is a longitudinal cross-sectional view of a vibration wave driven motor and a drive force generating unit removably incorporated in the lens barrel of FIG. 1.

Referring to FIGS. 1 and 2, the reference numeral 1 designates a fixed cylinder having an inwardly directed flange 1a. The reference numeral 2 denotes an outer cylinder having an inwardly directed flange 2a. The reference numeral 3 designates a cam cylinder fastened to an inwardly directed flange 7a by a screw 4 and having a cam slot 3a formed in the cylinder portion thereof. The reference numeral 5 denotes a lens holder fitted to the bore portion of the cam cylinder 3. The reference numeral 6 designates a cam screw fitted into the cam slot 3a in the cam cylinder 3 and fixed on the lens holder 5. The letter L denotes a lens fixed to the lens holder 5. The reference numeral 7 designates a cylindrical member as a fixed support member which provides the frame or base plate of a drive force generating unit A which will be described later. The cylindrical member 7 constitutes a drive force generating unit with the inwardly directed flange 2a of the outer cylinder 2 being fastened to the outwardly directed flange 7b of the cylindrical member 7 by a screw 8 (see FIG. 2). The inwardly directed flange 1a of the fixed cylinder 1 is fastened to the inwardly directed flange 7a of the cylindrical member, 7 by a screw 9 to provide a structure for fixing the fixed cylinder 1. The reference numeral 10 denotes a manually operated ring fitted in a circumferential groove formed in the outer peripheral surface of the fixed cylinder 1 and to the outer periphery of a manual collar 25 which will be described later and rotatable about the center axis Z (i.e., the optic axis) of the lens L.

On the outer peripheral surface of the cylindrical member 7, as shown in FIG. 2, there are carried all constituents of a vibration wave driven motor B and a motor bearing and output member C which is in contact with the rotor portion of the vibration wave driven motor B.

Description will hereinafter be made of the constituents of the vibration wave driven motor B and the structure, etc. of the motor bearing and output member C.

The vibration wave driven motor B is comprised of various members such as an annular vibration member 11 of a trapezoidal cross-sectional shape, an electrostrictive element (an electromechanical energy conversion element formed by a piezo-electric element or the like) 12 physically joined to one end surface of the vibration member 11, an annular vibration absorbing member 13 formed of felt or like material and urged against the surface of the element 12, an annular counter-sunk spring 14 for pushing the vibration absorbing member 13 toward the vibration member 11, an annular holding member 15 for holding the pushing force of the counter-sunk spring 14 between itself and the cylindrical member 7, an annular circumferentially movable member 16 which is the rotor of the vibration wave driven motor B, a rotatable cylinder 17 rotatable with the circumferentially movable member 16, a rubber ring 18 closely sandwiched between the rotatable cylinder 17 and the circumferentially movable member 16 for preventing axial movement of the circumferentially movable member 16 from being transmitted to the rotatable cylinder 17, and a vibration member rotation stopping projection 7c provided on the cylindrical member 7 and inserted in a groove 11a in the vibration member 11 for stopping the vibration of the vibration member 11 itself.

This vibration wave driven motor B is of such a construction that the circumferentially movable member 16 and the rotatable cylinder 17, designed to be rotatable together, and the rubber ring 18, are rotated about the optic axis Z by a circumferential travelling wave vibration generated in the vibration member 11.

Figure 3:
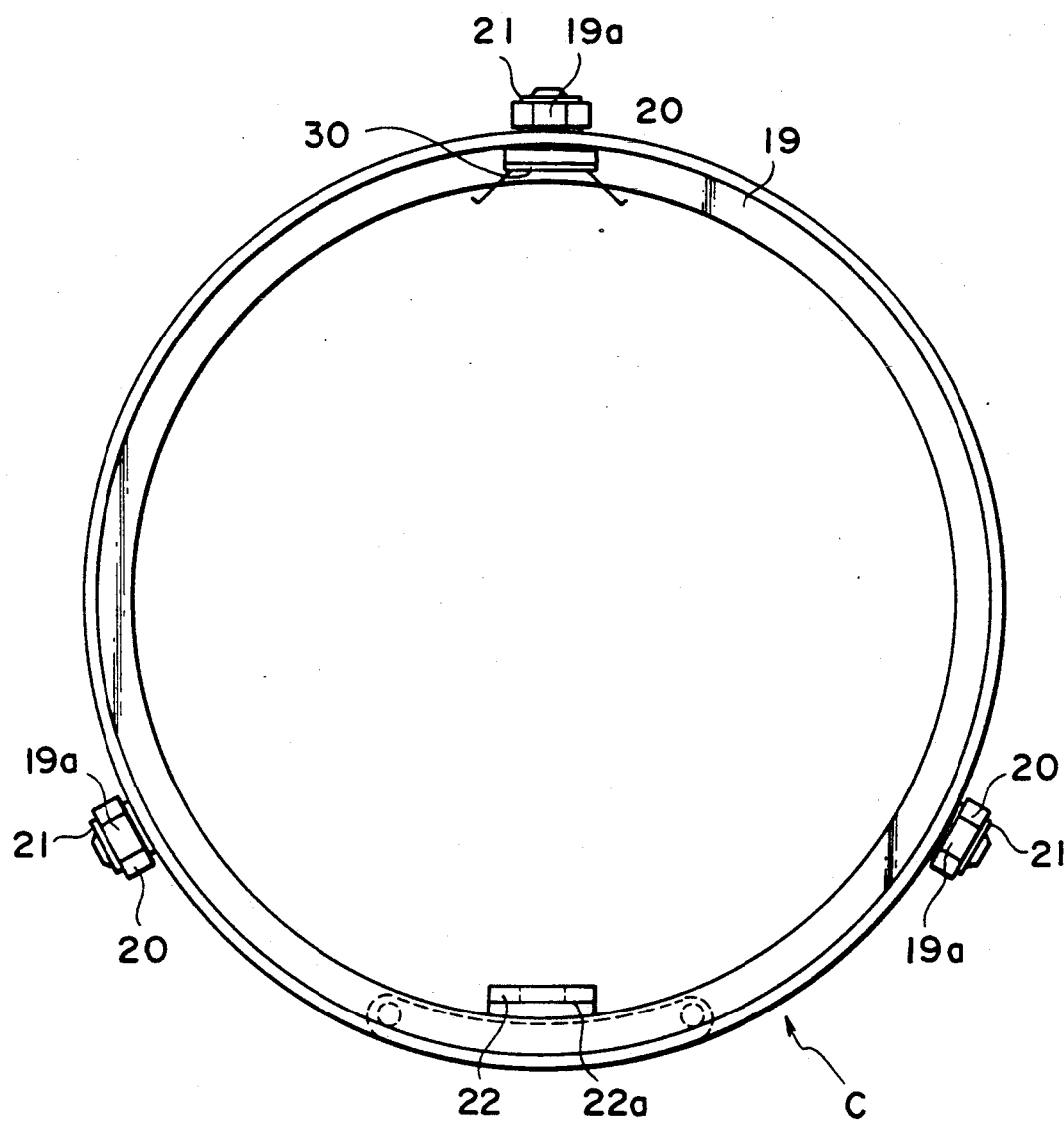
FIG. 3 is a front view of the motor bearing and output member C of the unit.

The motor bearing and output member C disposed adjacent to one end surface of the rotatable cylinder 17 of the vibration wave driven motor B, as shown in FIGS. 2 and 3, is comprised of a ring 19 rotatably fitted to the outer peripheral surface of the cylindrical member 7, roller supporting shafts 19a provided on radial axes orthogonal to the axis Z of the ring 19 (the axis of the vibration wave driven motor, i.e., the optic axis) so as to protrude from the outer peripheral surface of the ring 19 at least three locations on the circumference of the ring 19, rollers 20 rotatably fitted on the roller supporting shafts 19a, and washers 21 supporting the rollers 20 against slippage from the roller supporting shafts 19a.

The ring 19 serves also as the output member of the drive force generating unit A, and an L-shaped lens holder driving member 22 for rotatively driving the lens holder 5 is fastened to one end surface of the ring 19 by a screw 23. The lens holder driving member 22 is formed with a cut-away portion 22a, into which the cam screw 6 is fitted, whereby the lens holder 5 can be rotated by the operation of the lens holder driving member 22. Also, the outer peripheral surface 17a of the rotatable cylinder 17 is engaged with the end surface of each roller 20 to thereby prevent back-lash of the rotatable cylinder 17 in the radial direction during rotation of the rotatable cylinder 17. Further, on the outer peripheral surface of each roller 20, the end surface of the rotatable cylinder 17 is in contact with the end surface of a manual operation force input ring 24 for inputting the rotational torque of the manually operated ring 10. The mutual contact pressure among the outer peripheral surfaces of the rollers 20 and the end surface of the rotatable cylinder 17 and the end surface of the manual operation force input ring 24 is determined by the pressure force of the counter-sunk spring 14 which is a constituent of the vibration wave driven motor B.

The reference numeral 25 designates an annular member fixed to the cylindrical member 7. The manually operated ring 10 is rotatably fitted to the manual collar 25, thereby providing a structure which is good in the sense of manual operation. On the other hand, the manual operation force input ring 24 is in contact with the outer peripheral surface of each roller 20 in one end surface (the right end surface as viewed in FIGS. 1 and 2) thereof, and is in contact with the end surface of the manual collar 25 in the other end surface thereof. Also, the outer peripheral edge portion of the manual operation force input ring 24 is engaged with a recess in the inner peripheral surface of the manually operated ring 10, and the manual operation force input ring 24 is adapted to be rotated by the manually operated ring 10. The manual operation force input ring 24 is rotatable only when a driving torque greater than the frictional resistance thereof with respect to the manual collar 25 is transmitted from the manually operated ring 10, and is not rotated during other time. Accordingly, the manual operation force input ring 24 will not be rotated unless the user operates the manually operated ring 10 by rotating it with a rotational torque overcoming the frictional resistance between the manual operation force input ring 24 and the manual collar 25.

The reference numeral 26 denotes a pulse plate holder sandwiched between the cylindrical member 7 and the outer cylinder 2 and rotatable about the optic axis Z. The pulse plate holder 26 has a pulse plate 27, which will be described later, secured to the left end thereof, and has a projected portion 26a on the right end. The projected portion 26a passes through an aperture in the cylindrical member 7 and is engaged with the grooved portion 19b of the ring 19, whereby the pulse plate holder is rotatable with the ring 19. The reference numeral 27 designates a pulse plate formed with a number of slits. The reference numeral 28 denotes a photoelectric transmission type switch for detecting the rotation of pulse plate 27 about the optic axis Z by the slit portion of the pulse plate 27, for sending a signal to a control circuit, not shown, and for controlling and driving the vibration wave driven motor B. The reference numeral 29 designates a switch holding plate to which the photoelectric transmission type switch 28 is secured. The switch holding plate 29 is fixed to the cylindrical member 7 by a well-known method. The reference numeral 30 denotes a contact piece brush fixed to the ring 19 and adapted to slide on a flexible printed plate 31 provided on the outer periphery of the cylindrical member 7, by the rotation of the ring 19. The role of this contact piece brush 30 is to transmit the information of the distance between infinity and the close distance during focusing and the information of the infinity end and the close distance end to a circuit, not shown.

The operation of the above-described structure will now be described.

When the user of the lens barrel tries to manually drive the lens holder 5, he rotatively operates the manually operated ring 10 about the optic axis Z with his fingers. Thereupon, the manual operation force input ring 24 overcomes the frictional resistance with respect to the manual collar 25 and is rotated about the optic axis Z. However, at this time, the vibration wave driven motor B is not yet driven and therefore, the rotatable cylinder 17 of the vibration wave driven motor B is stationary due to the frictional force between the vibration member 11 and the circumferentially movable member 16. Accordingly, the rollers 20 roll along the end surface of the rotatable cylinder 17 while being rotated by the manual operation force input ring 24. As a result, the ring 19 is rotated about the optic axis Z through the roller supporting shafts 19a and the lens holder 5 moves axially along the cam slot 3a in the cam cylinder 3 while being rotated by the engagement between the lens holder driving member 22 and the cam screw 6, whereby manual focusing is effected.

On the other hand, when the user of the lens barrel tries to drive the lens holder 5 by the force of the vibration wave driven motor B, he operates a focusing switch, not shown. Therefore, a voltage is applied to the element 12 by the operation of a conventional control circuit, not shown, and as a result, vibration travelling in the circumferential direction is generated in the vibration member 11. By the vibration of the vibration member 11, the circumferentially movable member 16, the rubber ring 18 and the rotatable cylinder 17 are rotated about the optic axis Z. By this rotation, the rollers 20 receive rotational torque from the rotatable cylinder 17. However at this time, the manually operated ring 10 is not yet rotatively operated and therefore the manual operation force input ring 24 also is not rotated. Thus, the rollers 20 roll along the end surface of the manual operation force input ring 24 while rotating about the roller supporting shafts 19a, and the ring 19 is rotated about the optic axis Z through the roller supporting shafts 19a. Therefore, the lens holder 5 moves axially along the cam slot 3a in the cam cylinder 3 while being rotated by the engagement between the lens holder driving member 22 and the cam screw 6, whereby auto-focusing is effected.

Figure 4:
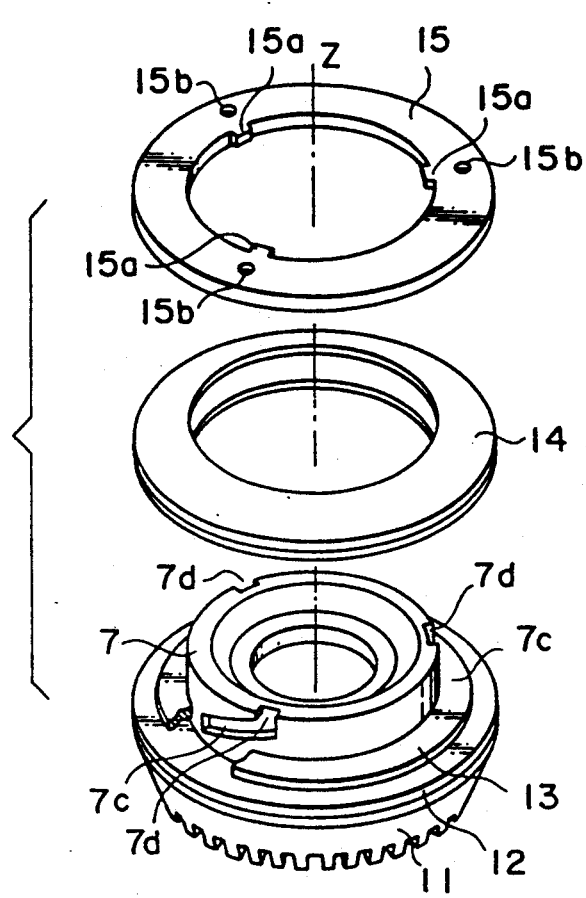
FIG. 4 is a perspective view showing an embodiment of the pressure force adjusting mechanism.
Figure 5:
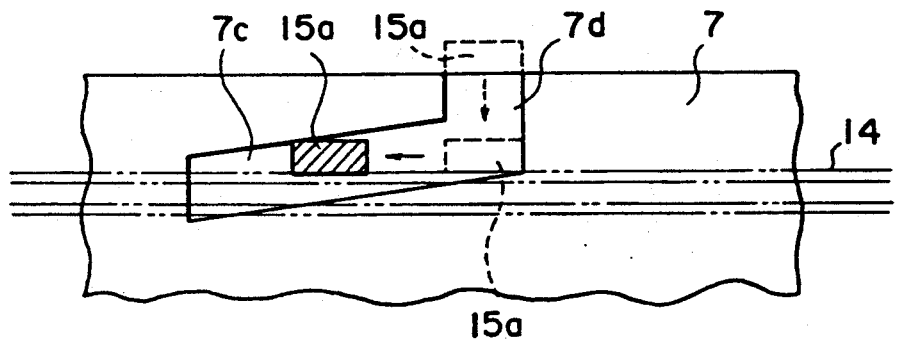
FIG. 5 is a fragmentary view of the pressure force adjusting mechanism in FIG. 4.

Now, the vibration wave driven motor is used as a drive source for effecting auto-focusing. However as a condition for stabilizing the motor performance of this vibration wave driven motor, it is necessary to make the pressure force value of the counter-sunk spring 14 correctly coincident with the design value. Therefore, in the present embodiment, adjustment of the pressure force of the counter-sunk spring 14 as will be described below is effected. This state is shown in FIGS. 4 and 5. In these figures, reference characters are similar to those in FIGS. 1 to 3.

In the cylindrical member 7, grooves (bayonet grooves) each formed by a tapered cam slot 7c and a straight groove 7d are formed at three locations at equal intervals. On the holding member 15, three projections 15a are provided so as to correspond to the three grooves. Also, in the holding member 15, apertures 15b engaged by three pins provided on a weight, not shown, are formed at three locations.

An embodiment of the pressure force adjusting method in this structure will now be described.

With the vibration member 11, the conversion element 12, the vibration absorbing member 13, etc. of the vibration wave driven motor being incorporated in the cylindrical member 7, the counter-sunk spring 14 is first inserted into the cylindrical member 7, which is then placed onto the vibration absorbing member 13. The three projections 15a of the holding member 15 are inserted into the straight grooves 7d of the cylindrical member 7. In that state, a weight, not shown, equivalent to a set pressure force value is placed onto the holding member 15 with the three pins of the weight being registered with the three apertures 15b in the holding member 15. If this state is held, it follows that the pressure force has been adjusted to the set pressure force value. That is, if as the holding method, the holding member 15 on which the weight is placed is rotated clockwise until it bears against one of the points on the tapered cam portions of the tapered cam slots 7c in the cylindrical member 7 (see FIG. 5) and in this state, the projections 15a of the holding member 15 are adhesively secured to the tapered cam slots 7c, the pressure force can be held at the design value even if the weight is removed. If this method is adopted, much time will not be spent for the adjustment of the pressure force and the pressure force values will not individually be irregular. The reason why three pins are provided on the weight and brought into engagement with the apertures 15b in the holding member 15 is that when the holding member 15 is to be rotated until it bears against one of the points on the tapered cam portions of the tapered cam slots 7c in the cylindrical member 7, the holding member 15 becomes rotatable by the rotation of the weight itself through the engagement between the pins and the apertures 15b.

An alternative structure of the present invention, there can be used such structure that the weight is not directly placed on the holding member 15 but is directly placed on the counter-sunk spring 14 itself and the holding member 15 is rotated, and of course, in this case, the present invention comes into existence.

Figure 6:
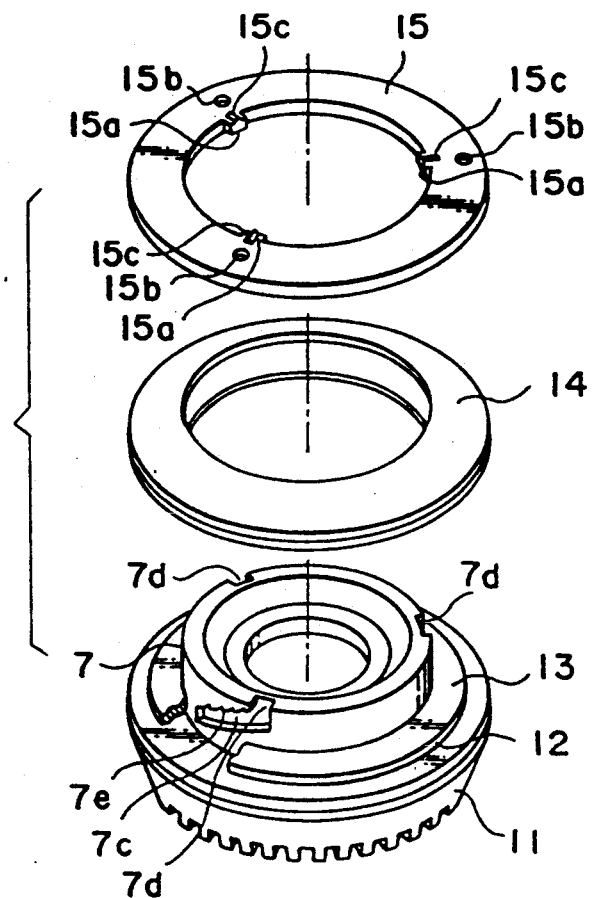
FIG. 6 is a perspective view showing a pressure force adjusting mechanism according to another embodiment of the present invention.
Figure 7:
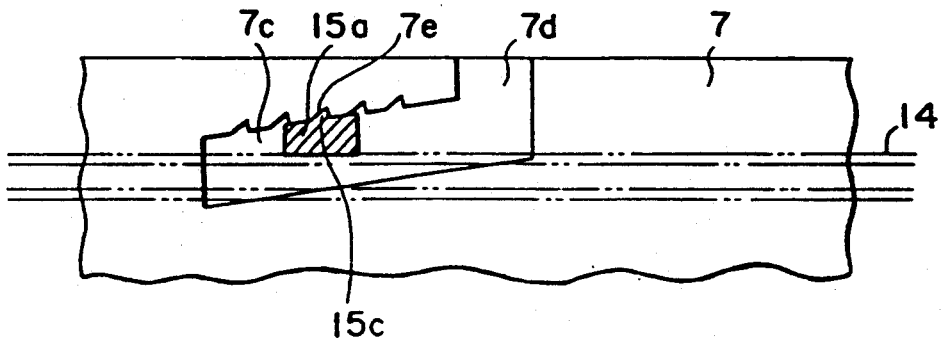
FIG. 7 is a fragmentary view of the pressure force adjusting mechanism in FIG. 6.

As described above, according to the present invention, adjustment of the pressure force of the vibration wave driven motor has become very simple, and as a method of holding the pressure force, description has been made that finally, the tapered cam portions of the tapered cam slots 7c and the projections 15a of the holding member 15 are adhesively secured to each other. However, a method of mechanically holding the pressure force, instead of adhesively securing, is shown in FIGS. 6 and 7. In these figures, reference characters are similar to those in FIGS. 1 to 5. The method of incorporation is the same as what has been described in connection with FIG. 4 and therefore need not be described. The differences of the method of FIGS. 6 and 7 from the method of FIG. 4 are that ratchet pawls 15c are provided on the projections 15a of the holding member 15 and that ratchet grooves 7e are provided in the tapered cam slots 7c of the cylindrical member 7 which are engaged by the ratchet pawls 15c. By adopting such structure, the position of the holding member 15 does not deviate in the direction of the optic axis due to the pressure force of the counter-sunk spring 14 and is held by ratchet coupling (see FIG. 7). Thus, the pressure force can be held. In FIG. 7, the ratchets are provided at five locations, but of course, by increasing the number of ratchets, finer adjustment becomes possible.

Figure 8:
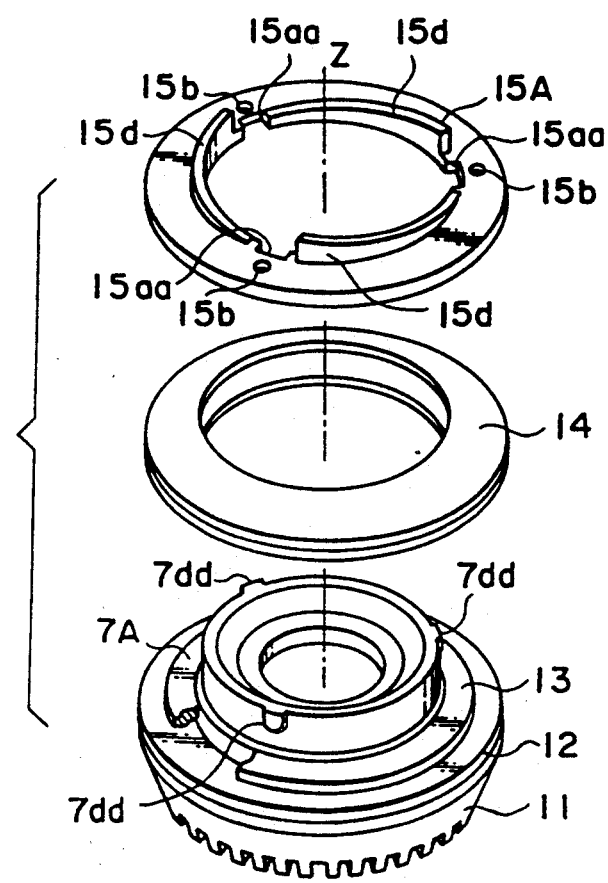
FIG. 8 is a perspective view of a pressure force adjusting mechanism according to still another embodiment of the present invention.
Figure 9:
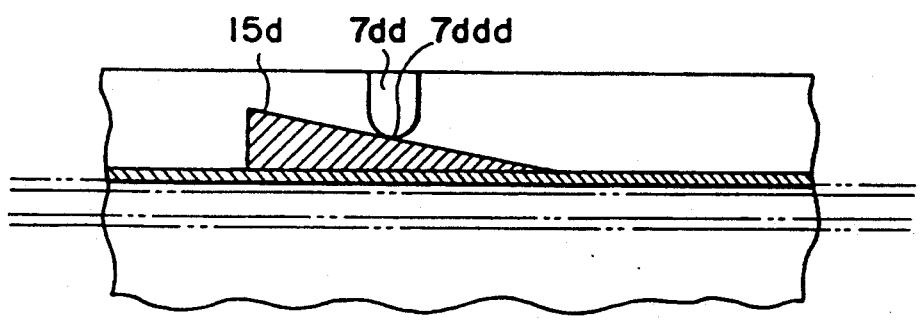
FIG. 9 is a fragmentary view of the mechanism shown in FIG. 8.

The above-described embodiment is of such structure that tapered cam slots 7c are formed in the cylindrical member 7 and the projections 15a of the holding member 15 are fitted in the cam slots 7c. However a system in which the cylindrical member 7 and the holding member 15 are made structurally converse is shown in FIGS. 8 and 9. In FIGS. 8 and 9, elements functionally similar to those in FIGS. 6 and 7 are given similar reference characters and need not be described.

Referring to FIG. 8, a holding member 15A has three cut-aways 15aa into which the projections 7dd of a cylindrical member 7A are fitted, and three inclined portions 15d are provided between the cut-aways 15aa on the inner peripheral side of the holding member.

When the pressure force is to be set for the counter-sunk spring 14, the cut-aways 15aa of the holding member 15A are registered with the locations of the projections of the cylindrical member 7A, where after the holding member 15A is dropped onto the counter-sunk spring 14 and the holding member 15A is rotated counter-clockwise until the tip ends of the projections 7dd come into contact with the upper ends of the inclined portions 15d of the holding member 15A. When as shown in FIG. 9, the tip end 7ddd of each projection 7dd has come into contact with the upper end of each inclined portion 15d, rotation of the holding member 15A is stopped. Thus, a desired pressure force is applied to the counter-sunk spring 14 by a simple operation and at an accurate value.

As described above, according to the present invention, a holding member for holding the pressure force of a pressing member is mounted relative to a fixed support member for supporting a vibration wave driven motor, by the bayonet method, and the pressure force holding engagement surface of the holding member and the fixed support member is made into an inclined surface inclined with respect to the axial direction, whereby a pressure force adjusting method as will be described below becomes possible. That is, a method whereby a pressure force required between the elastic member and the movable member of the vibration wave driven motor is applied to the pressing member and in that state, the holding member is rotated in accordance with the bayonet structure until it bears against one of the points on the pressure force holding engagement surface, and the holding member is fixed at that point becomes possible.

This method is not a method of controlling the pressure force by the amount of flexure of the pressing member as in the prior art, but a method of controlling the necessary pressure force itself. Accordingly, the irregularity of the pressure force value becomes substantially null and the pressure force adjusting time is remarkably shortened by a simple construction. Further, adjusting washers or the like become unnecessary, and this is advantageous with respect to space and cost and leads to a tremendous effect.

I claim:

1. A pressure force adjusting mechanism for a vibration wave driven motor for applying a predetermined pressure force for causing relative movement between an annular elastic member in which a travelling vibration wave is formed and a movable member, the mechanism comprising:
   a pressing member for pressing said elastic member toward said movable member;
   a fixed support member for movably supporting said elastic member, said support member having an inclined portion which is inclined relative to said pressing member; and
   a holding member receiving a reaction force of said pressing member and engaging a predetermined portion of the inclined portion of said support member.

2. A pressure force adjusting mechanism according to claim 1, wherein said holding member has a projection portion which engages the predetermined portion of said inclined portion.

3. A pressure force adjusting mechanism for a vibration wave driven motor for applying a predetermined pressure force for causing relative movement between an annular elastic member in which a travelling vibration wave is formed and a movable member, the mechanism comprising:
   a pressing member for pressing said elastic member toward said movable member;
   a fixed support member for movably supporting said elastic member, said support member having an inclined portion which is inclined relative to said pressing member; and
   a holding member receiving a reaction force of said pressing member and engaging a predetermined portion of the inclined portion of said support member, wherein said holding member has a projection portion which engages the predetermined portion of said inclined portion, and wherein said projection portion has a ratchet pawl.

4. A pressure force adjusting mechanism according to claim 3, wherein said inclined portion has a ratchet groove for engaging said ratchet pawl.

5. A pressure force adjusting mechanism for a vibration actuator for causing relative movement between a vibration member and a contact member in contact with said vibration member, the mechanism comprising:
   a pressing member for applying a predetermined pressure force between said vibration member and said contact member;
   a fixed support member having an inclined portion which is inclined relative to said pressing member; and
   a holding member receiving a reaction force of said pressing member and engaging a predetermined portion of the inclined portion of said support member.

6. A pressure force adjusting mechanism according to claim 5, wherein said inclined portion has a cam groove.

7. A system having a vibration driven motor for causing relative movement between a vibration member and a rotor driven by said vibration member, the system comprising:
   a pressing member for applying a predetermined pressure force between said vibration member and said rotor;
   a fixed support member having an inclined portion which is inclined relative to said pressing member;
   a holding member receiving a reaction force of said pressing member and engaging a predetermined portion of the inclined portion of said support member; and
   a movable first member driven by said rotor.

8. A system according to claim 7, wherein said first member includes an element for driving a phototaking lens.

* * * * *

UNITED STATES PATENT AND TRADEMARK OFFICE
CERTIFICATE OF CORRECTION

PATENT NO. : 5,216,314

DATED : June 1, 1993

INVENTOR(S) : SUZUKI

Page 1 of 2

It is certified that error appears in the above-identified patent and that said Letters Patent is hereby corrected as shown below:

Column 1

Line 21, change "member and the" to --member. The--.
    Line 27, change "n" to --an--.
    Line 28, change "conical" to --conical- --.
    Line 55, change "system" to --system,-- and change "fastened" to --fastened,--.
    Line 64, delete "but".

Column 3

Line 8, change "member, 7" to --member 7--.

Column 4

Line 26, change "annular mem-" to --annular manual collar which is a frictional force stabilizing mem- --.
    Line 45, change "time." to --times.--.
    Line 57, change "end." to --end thereof.--.

Column 5

Line 46, change "However" to --However,--.
    Line 59, change "However" to --However,--.

Column 6

Line 45, change "An" to --As an--.

UNITED STATES PATENT AND TRADEMARK OFFICE
CERTIFICATE OF CORRECTION

PATENT NO. : 5,216,314
DATED : June 1, 1993
INVENTOR(S) : SUZUKI

It is certified that error appears in the above-identified patent and that said Letters Patent is hereby corrected as shown below:

<u>Column 7</u>

Line 11, change "However" to --However,--.

<u>Column 8</u>

Line 37, change "actuator" to --driven actuator--.

Signed and Sealed this

Third Day of May, 1994

Attest:

BRUCE LEHMAN

Attesting Officer  Commissioner of Patents and Trademarks